United States Patent
Fors et al.

(10) Patent No.: US 10,963,997 B2
(45) Date of Patent: Mar. 30, 2021

(54) METHOD FOR REDUCING INTENSITY VARIATIONS IN A VIDEO IMAGE STREAM DEPICTING A SCENE

(71) Applicant: Axis AB, Lund (SE)

(72) Inventors: Sebastian Fors, Lund (SE); Johan Jeppsson, Lund (SE); Anton Ohrn, Lund (SE); Jimmie Jonsson, Lund (SE); Bjorn Benderius, Lund (SE); Andreas Muhrbeck, Lund (SE); Karin Dammer, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/690,429

(22) Filed: Nov. 21, 2019

(65) Prior Publication Data
US 2020/0167901 A1 May 28, 2020

(30) Foreign Application Priority Data
Nov. 27, 2018 (EP) .................................... 18208425

(51) Int. Cl.
G06T 5/00 (2006.01)
H04N 5/235 (2006.01)

(52) U.S. Cl.
CPC ........... *G06T 5/008* (2013.01); *H04N 5/2351* (2013.01); *H04N 5/2352* (2013.01); *G06T 2207/10016* (2013.01); *G06T 2207/20208* (2013.01)

(58) Field of Classification Search
CPC ........... G06T 5/008; G06T 2207/10016; G06T 2207/20208; G06T 5/50; H04N 5/2351; H04N 5/2352; H04N 5/235; H04N 5/14; H04N 7/18
See application file for complete search history.

(56) References Cited

U.S. PATENT DOCUMENTS

2005/0259177 A1 11/2005 Senoo
2010/0329554 A1 12/2010 Zhai et al.
(Continued)

FOREIGN PATENT DOCUMENTS

| JP | 2008-107565 A | 5/2008 |
|---|---|---|
| WO | 2014/130468 A1 | 8/2014 |
| WO | 2016/194296 A1 | 12/2016 |

OTHER PUBLICATIONS

Extended European Search Report dated May 16, 2019 for the European Patent Application No. 18208425.1.

*Primary Examiner* — Yogesh K Aggarwal
(74) *Attorney, Agent, or Firm* — Volpe Koenig

(57) ABSTRACT

A method and a digital video camera for reducing intensity variations in a video stream depicting a scene comprising capturing, using a first sensor setting, a first frame; detecting a change in intensity in a portion of the first frame, the portion represents a first area of the scene; determining a second sensor setting based on the first frame; capturing, using the second sensor setting, a second frame; creating a local tone mapping mask, wherein a local tone mapping in the first area of the scene is different from a local tone mapping in an area outside the first area, and wherein the local tone mapping in the area outside the first area is based on a relation between the first sensor setting and the second sensor setting; and applying the local tone mapping mask to the second frame.

9 Claims, 4 Drawing Sheets

(56) References Cited

U.S. PATENT DOCUMENTS

| | | | |
|---|---|---|---|
| 2015/0110399 A1* | 4/2015 | Valdes Lopez | H04N 5/243 |
| | | | 382/167 |
| 2016/0232419 A1 | 8/2016 | Bai et al. | |
| 2017/0272637 A1 | 9/2017 | Kawazoe | |
| 2019/0098196 A1* | 3/2019 | Bessou | H04N 5/2353 |

* cited by examiner

METHOD FOR REDUCING INTENSITY VARIATIONS IN A VIDEO IMAGE STREAM DEPICTING A SCENE

TECHNICAL FIELD

The present invention relates to a method for reducing intensity variations in a video image stream depicting a scene.

BACKGROUND

Video monitoring is widely used in today's society, with a multitude of different applications. For instance, many stores typically have video cameras installed to combat shoplifting. Likewise, it is also often important to monitor outdoor locations in order to detect accidents, thefts, or locate missing people. For instance, parking lots, entrances to buildings, and roads are a few examples where such monitoring typically is of interest.

However, it is often difficult to discern details in scenes with low light levels since the captured video is typically underexposed. One way to increase the light levels in such cases is to introduce an external light source illuminating the scene, but such a solution is often not desirable due to the increased power consumption, and that the external light source also can disclose the location of the video camera, which is usually not desirable.

An alternative way is to increase the exposure time of the video camera in order to collect more light in the scene. Such a solution makes it possible to increase the light levels in the video. However, a problem arises if a bright object, such as an electric torch, enters in a part of the scene. Since the light level in that part of the scene suddenly increases, the exposure time of the camera is decreased in order reduce the amount of collected light and therefore trying to avoid an overexposure of the scene. The resulting video, however, will not be optimized, since darker parts of the scene will again be underexposed due to the short exposure time, and the bright part typically is still partly saturated. Thus, there is a need to improve video monitoring of scenes with large changes in brightness.

SUMMARY

Providing a method and digital video camera for reducing intensity variations in a video stream depicting a scene would be desirable.

Additionally, mitigating, alleviating or eliminating one or more of the above-identified deficiencies in the art and disadvantages singly or in any combination and solving at least the above mentioned problem would also be desirable.

According to a first aspect, a method for reducing intensity variations in a video image stream depicting a scene is provided. The method comprises: capturing, using an image sensor set to a first sensor setting, a first frame of the video image stream; detecting a local change in intensity values in a portion of the first frame, wherein the portion of the first frame represents a first area of the scene; determining a second sensor setting based on the intensity values in the first frame; capturing, using the image sensor set to the second sensor setting, a second frame of the video image stream, the second frame being subsequent to the first frame; creating a local tone mapping mask, wherein a local tone mapping in the first area of the scene is different from a local tone mapping in an area outside the first area of the scene, and wherein the local tone mapping in the area outside the first area of the scene is based on a relation between the first sensor setting and the second sensor setting; and applying the local tone mapping mask to the second frame of the video image stream.

The wording "intensity variations" should, within the context of this application, be construed as variations in intensity values in pixels within a frame.

The wording "local change in intensity values" should, within the context of this application, be construed as an increase or decrease in intensity values in pixels within a part of the frame.

The wording "local tone mapping mask" should, within the context of this application, be construed as an image mask comprising information related to a tone mapping of an image.

By means of the present method it is possible to create and apply a local tone mapping mask that, in an area outside the first area of the scene, compensates for a change in sensor setting caused by a change in intensity values in the first area of the scene. By means of the present method, it is further possible to apply the local tone mapping mask to the first frame in the video image stream that is captured with the second sensor setting.

A sensor setting may be one or more chosen from the group comprising: a sensor exposure time; and a sensor gain.

The wording "sensor gain" should, within the context of this application, be construed as a gain applied in the image sensor. The applied gain may be analog and/or digital gain. Analog gain increases an analog signal from the image sensor before the analog signal is transformed to a digital signal, i.e. an increase of the signal prior to A/D conversion of the signal. Digital gain increases the digital signal, i.e. an increase of the signal subsequent to A/D conversion of the analog signal.

The second sensor setting may be an adjustment of sensor exposure time and/or sensor gain in relation to the first sensor setting.

The relation between the first sensor setting and the second sensor setting may be a ratio between the first sensor setting and the second sensor setting.

In the act of creating a local tone mapping mask, a local tone mapping in the first area of the scene may be based on the second sensor setting.

Basing the local tone mapping in the first area of the scene on the second sensor setting permits the tone mapping in the first area of the scene to change the intensity value in a portion of the second frame associated with the first area of the scene. Thereby, it may be possible to reduce intensity variations in the second frame in the video image stream.

The local tone mapping mask may further comprise a gradient transition between the first area and the area outside the first area.

Utilizing a local tone mapping mask comprising a gradient transition between the first area and the area outside the first area permits a gradual transition between portions associated with the first area and the area outside the first area may be achieved in the second frame.

The method may further comprise for frames subsequent to the second frame, gradually adjusting the local tone mapping mask towards a predetermined local tone mapping mask.

Gradually adjusting the local tone mapping mask towards a predetermined local tone mapping mask for frames subsequent to the second frame permits a less complex local tone mapping mask to be applied to frames subsequent to the second frame. A less complex local tone mapping mask may require less computing power than a computing power associated with determining a local tone mapping mask.

The method may further comprise: detecting a second local change in intensity values in a second portion of the first frame, wherein the second portion of the first frame represents a second area of the scene; and wherein, in the act of creating the local tone mapping mask, a local tone mapping in the second area of the scene is different from a local tone mapping in an area outside the second area of the scene, and wherein the local tone mapping in the area outside the second area of the scene is based on a relation between the first sensor setting and the second sensor setting.

In the act of creating a local tone mapping mask, a local tone mapping in the second area of the scene may be based on the second sensor setting.

Basing the local tone mapping in the second area of the scene on the second sensor setting permits the tone mapping in the second area of the scene to change the intensity value in a portion of the second frame associated with the second area of the scene. Thereby, it may be possible to reduce intensity variations in the second frame in the video image stream.

The method may further comprise: capturing, using the image sensor set to the first sensor setting, an intermediate frame of the video stream, the intermediate frame being subsequent to the first frame and antecedent to the second frame; detecting a further local change in intensity values in a further portion of the intermediate frame, wherein the further portion of the intermediate frame represents a further area of the scene; determining a third sensor setting based on the intensity values in the intermediate frame; capturing, using the image sensor set to the third sensor setting, a third frame of the video image stream, the third frame being subsequent to the second frame; creating a further local tone mapping mask, wherein a local tone mapping in the first area of the scene and the further area of the scene is different from an area outside the first area of the scene and the further area of the scene, and wherein the local tone mapping in the area outside the first area of the scene and the further area of the scene is based on a relation between the first sensor setting and the third sensor setting; applying the further local tone mapping mask to the third frame of the video stream.

In the act of creating a further local tone mapping mask, a local tone mapping in the first area of the scene and the further area of the scene may be based on the third sensor setting.

Basing the local tone mapping in the first area of the scene and the further area of the scene on the third sensor setting permits the tone mapping to change the intensity value in portions of the third frame associated with the first area of the scene and the further area of the scene. Thereby, it may be possible to reduce intensity variations in the third frame in the video image stream.

According to a second aspect, a digital video camera configured to capture a video image stream depicting a scene is provided. The digital video camera comprises: an image sensor configured to be set in different sensor settings, and to capture different frames of the video image stream; a control circuitry comprising: an intensity evaluation function configured to detect a local change in intensity values in a portion of a first frame captured by the image sensor set to a first sensor setting, wherein the portion of the first frame represents a first area of the scene; a sensor setting determination function configured to determine a second sensor setting based on the intensity values in the first frame; a local tone mapping mask function configured to create a local tone mapping mask, wherein a local tone mapping in the first area of the scene is different from a local tone mapping in an area outside the first area of the scene, and wherein the local tone mapping in the area outside the first area of the scene is based on a relation between the first sensor setting and the second sensor setting, and to apply the local tone mapping mask to a second frame captured by the image sensor set to the second sensor setting.

The above mentioned features of the first aspect, when applicable, apply to this second aspect as well. In order to avoid undue repetition, reference is made to the above.

The image sensor and the control circuitry may be synced at a frame level.

The image sensor and the control circuitry being synced at a frame level permits the local tone mapping mask and the sensor exposure setting to be changed for the same frame in the video image stream.

A function of the control circuitry may be implemented as a computer software portion run on a general purpose processor or on a graphics processing unit, a field-programmable gate array, a fixed-function application-specific integrated circuit, or an analog circuit.

According to a third aspect, a non-transitory computer readable recording medium having recorded thereon program code which when executed at a device having processing capabilities is configured to perform the present method is provided.

The above mentioned features of the first and second aspects, when applicable, apply to this third aspect as well. In order to avoid undue repetition, reference is made to the above.

A further scope of applicability of the present embodiments will become apparent from the detailed description given below. However, it should be understood that the detailed description and specific examples, while indicating preferred variants of the present concept, are given by way of illustration only, since various changes and modifications within the scope of the disclosure will become apparent to those skilled in the art from this detailed description.

Hence, it is to be understood that these embodiments are not limited to the particular steps of the methods described or component parts of the systems described as such method and system may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects will now be described in more detail, with reference to appended drawings showing embodiments. The figures should not be considered limiting the invention to the specific embodiment; instead they are used for explaining and understanding the embodiments.

As illustrated in the figures, the sizes of layers and regions are exaggerated for illustrative purposes and, thus, are provided to illustrate the general structures of embodiments. Like reference numerals refer to like elements throughout.

DETAILED DESCRIPTION

The present embodiments will now be described more fully hereinafter with reference to the accompanying drawings, in which currently preferred variants of the inventive concept are shown. The embodiments may, however, be implemented in many different forms and should not be construed as limited to the variants set forth herein; rather, these variants are provided for thoroughness and completeness, and fully convey the scope of the embodiments concept to the skilled person.

A method for reducing intensity variations in a video stream depicting a scene will now be described with reference to FIG. 1A to FIG. 1D. FIG. 1A to FIG. 1D illustrate frames captured by a digital video camera 30, which will be described in more detail in relation to FIG. 3.

Figure 1A:
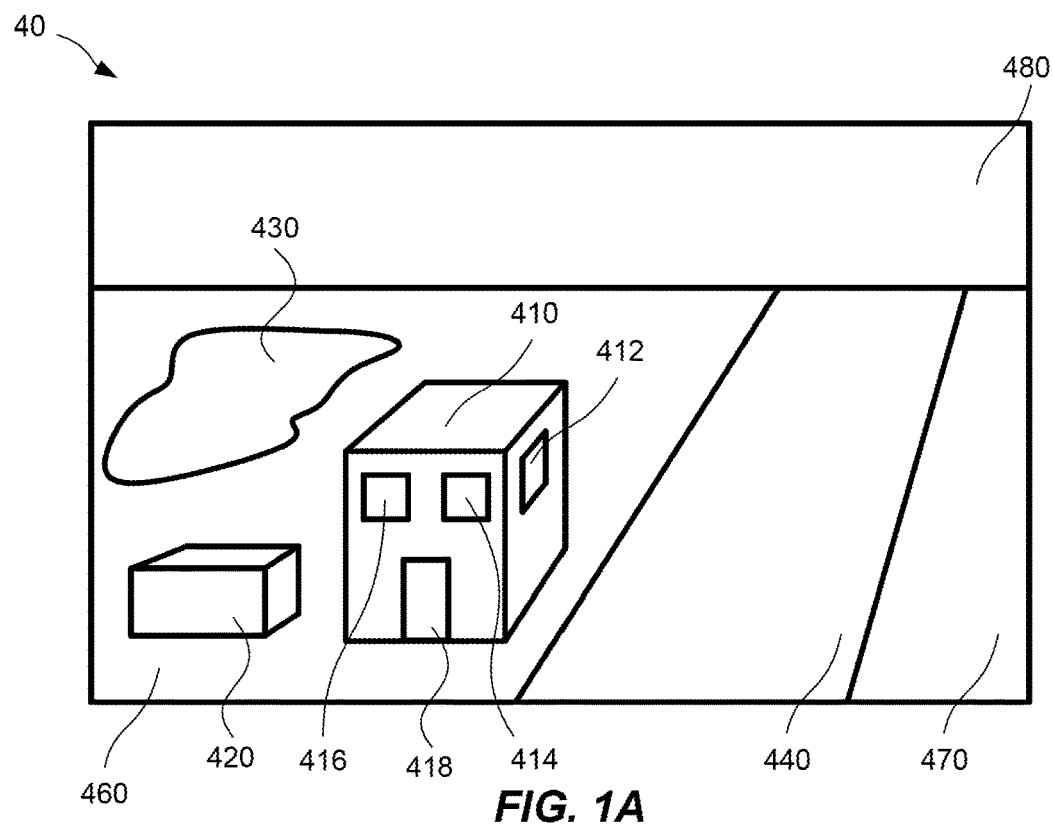
FIG. 1A illustrates an initial frame depicting a scene.

FIG. 1A illustrates an initial frame 40 depicting a scene. The scene comprises a field 460, a road 440, a side of the road 470, and a sky 480. The field 460 comprises a first structure 410, a second structure 420, and a lake 430. The initial frame 40 has been captured using an image sensor 302 set to a first sensor setting. A first local tone mapping mask has been applied to the initial frame 40. The first local tone mapping mask may be based on a first sensor setting of the digital video camera 30 used to capture the initial frame. As is seen in FIG. 1A, the first local tone mapping mask is configured to optimize a range of brightness levels in the initial frame 40. In other words, the first structure 410, the second structure 420, the lake 430, and the road 440 are visible in the initial frame 40. Also, a first feature 412, a second feature 414, a third feature 416, and a fourth feature 418 are visible on the first structure 410.

Figure 1B:
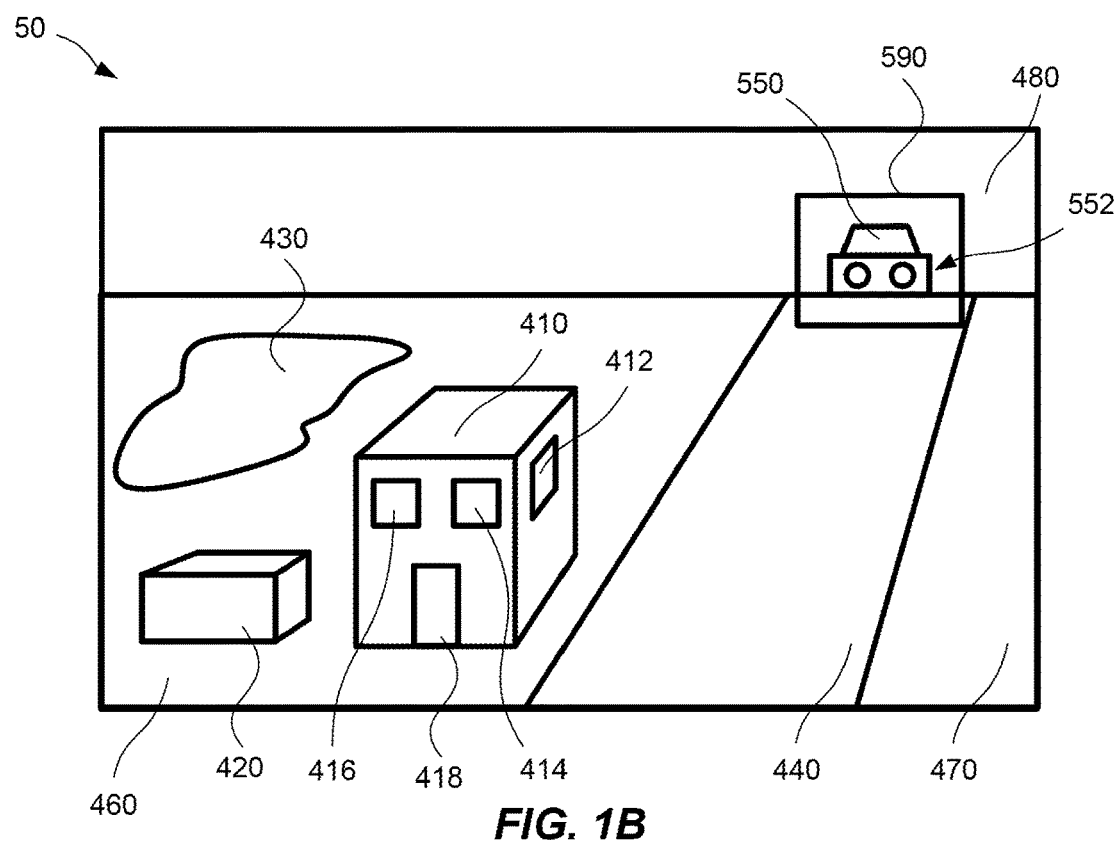
FIG. 1B illustrates a first frame depicting the scene.

FIG. 1B illustrates a first frame 50 depicting the same scene as in FIG. 1A. The first frame 50 is captured by the image sensor 302 set to the first sensor setting. As is seen in FIG. 1B, a car 550 has entered the scene in the first frame 50. The car 550 is comprised in a portion 590 of the first frame 50, and the portion 590 represents a first area of the scene. Headlights 552 of the car 550 are bright, and a range of intensity levels of light collected by the image sensor 302 for the scene depicted in FIG. 1B is larger than a range of intensity levels of light collected by the image sensor 302 for the scene depicted in FIG. 1A. In other words, in the example shown in FIG. 1A and FIG. 1B, a highest intensity level in the first frame 50 is higher than a highest intensity level in the initial frame 40. An intensity evaluation function 306 in a control circuitry 304 in the digital video camera 30 will detect a local increase in intensity values in the portion 590 of the scene. A sensor setting determination function 308 in the control circuitry 304 will determine a second sensor setting based on the intensity values in the first frame 50. In other words, the sensor setting determination function 308 adjusts the first sensor setting of the image sensor 302 to compensate for the increase in intensity values when capturing later frames in the video image stream. For instance, to compensate for the increase in brightness in the scene, a sensor exposure time and/or a sensor gain may be decreased. Thus, the control circuitry 304 sets the image sensor 302 to the second sensor setting.

Figure 1C:
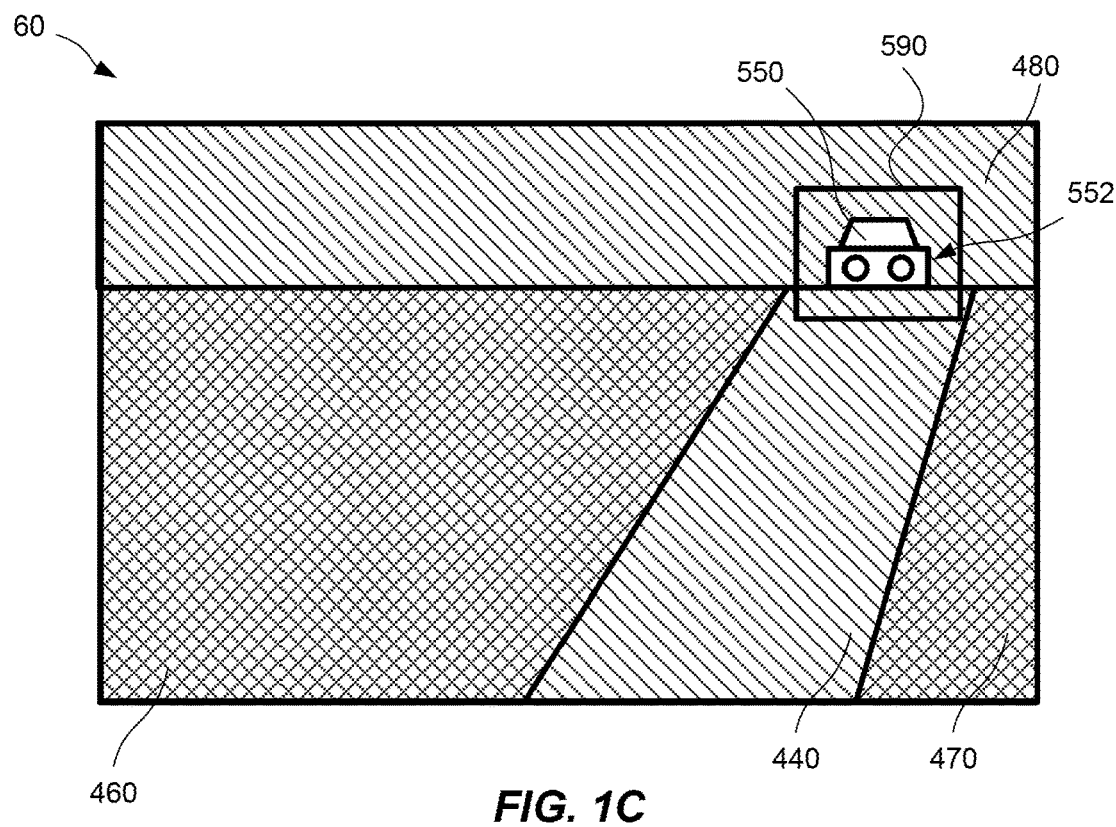
FIG. 1C illustrates a second frame depicting the scene.

FIG. 1C illustrates a second frame 60 depicting the same scene as in FIG. 1A and FIG. 1B. The second frame 60 is captured by the image sensor 302 set to the second sensor setting. In this specific example, the second sensor setting is a reduction of sensor exposure time, such that a second sensor exposure time is half of a first sensor exposure time. A second local tone mapping mask has been applied to the second frame 60. The second local mapping mask is configured to optimize the second frame. As is seen in FIG. 1C, the second sensor setting compensates the increase in intensity values from the headlights 552 of the car 550. A consequence of the second sensor setting is that while the car will be clearly visible, the road 440, the field 460, the side of the road 470, and the sky 480 will be underexposed as compared to an optimal setting for those areas in absence of a bright light source in the imaged scene. The intensity shift in these areas 440, 460, 470, 480 will be dramatic. As is exemplified in FIG. 1C, a visibility of the first structure 410, the second structure 420, the lake 430, and the road 440 is at least reduced due to the second sensor setting and the second local tone mapping mask. In other words, the second local tone mapping mask optimizes the second frame 60 such that the headlights 552 of the car 550 are not completely saturated, while other parts of the second frame 60 are not completely underexposed (i.e. to the extent that all information is lost). However, there will be an almost instantaneous shift in intensity in these other parts, and details in these not completely underexposed regions are not visible in the second frame 60. For instance, the first and second structures 410, 420 in the field 460 are not visible in the second frame 60 in FIG. 1C.

Figure 1D:
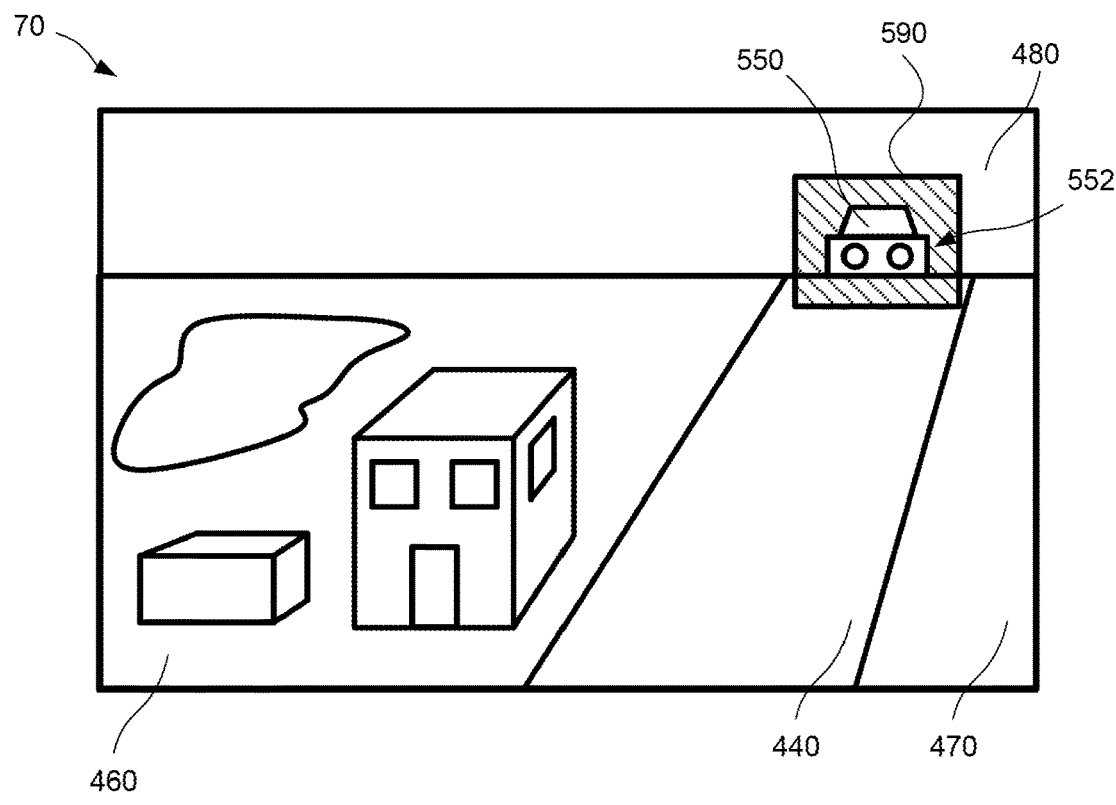
FIG. 1D illustrates the second frame with reduced intensity variations.

FIG. 1D illustrates the second frame 70 with reduced intensity variations. The reduction in intensity variations in the second frame 70 is achieved by creating a local tone mapping mask based on the first and second sensor settings and applying it to the second frame 60 illustrated in FIG. 1C. The local tone mapping mask is configured such that a tone mapping outside the first area of the scene is based on a relation between the first and second sensor settings. In the example shown in FIG. 1D, the tone mapping in the area outside the first area, is based on a ratio between the first and second sensor settings. In this specific example, the tone mapping in the area outside the first area compensates for the change in sensor exposure time.

Thus, an intensity of objects in the first area of the scene will be mapped to a specific pixel intensity value in the portion 590 of the second frame 70. Objects outside the first area of the scene, having half the intensity of objects in the first area of the scene, will be mapped to the same specific pixel intensity value in the second frame 70. In other words, an intensity in the scene is mapped to different pixel intensity values in the second frame 70 depending on if the intensity is in the first area of the scene or not. The local tone mapping mask is also configured such that a tone mapping in the first area of the scene is based on the second sensor setting. In other words, the tone mapping in the first area is the local tone mapping applied for the second frame 60 in FIG. 1C.

The frames described in relation to FIG. 1A to FIG. 1D are also comprised in a video image stream, however, the first frame 50 in FIG. 1B is a skipped frame and will therefore not be visible to a person observing the video image stream. Likewise, the second frame 60 in FIG. 1C is not included in favor for the second frame 70 with reduced intensity variations.

Figure 2:
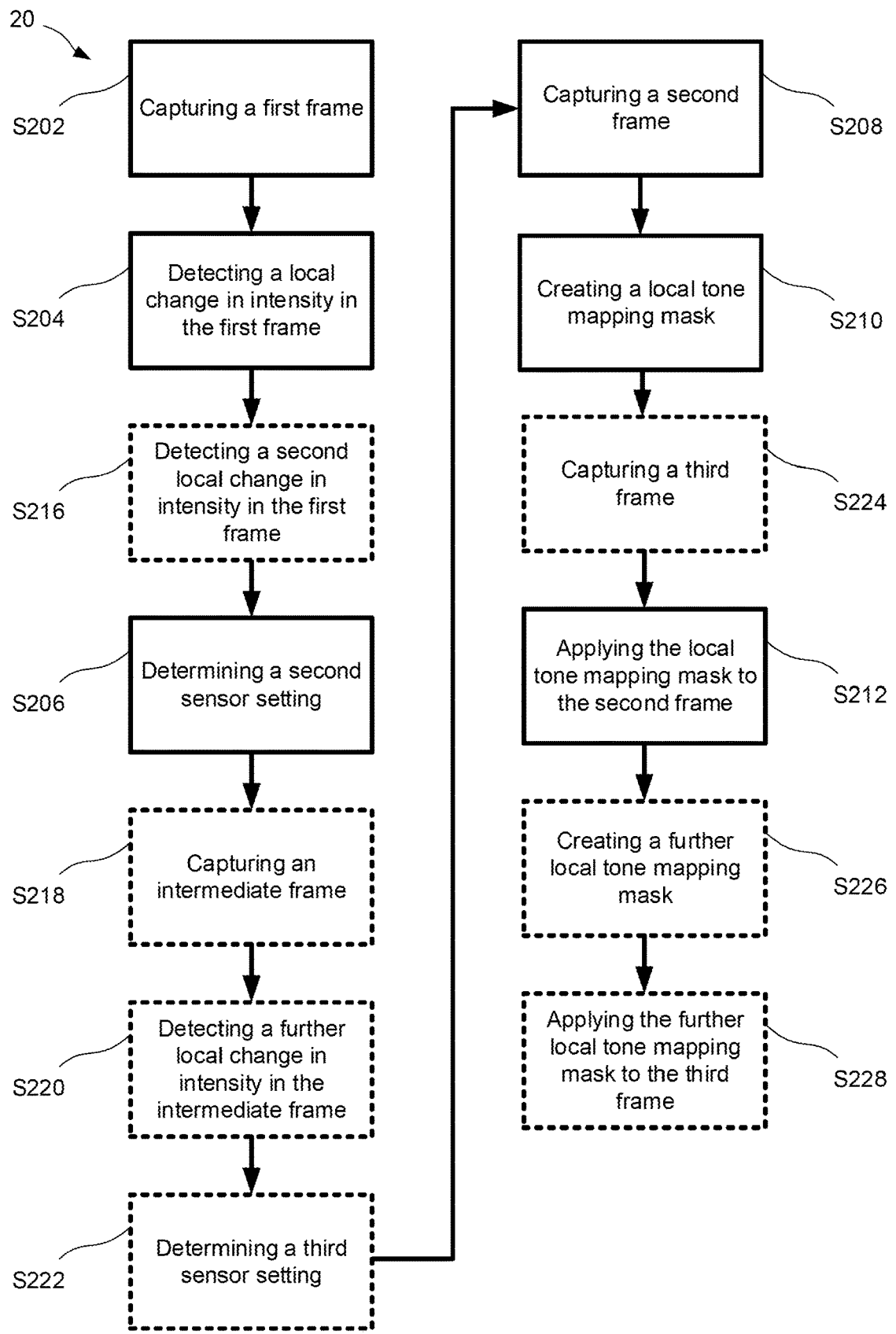
FIG. 2 is a block scheme of a method reducing intensity variations in a video stream depicting a scene.

FIG. 2 is a block scheme of a method 20 for reducing intensity variations in a video stream depicting a scene.

The method 20 comprises capturing S202, using an image sensor 302 set to a first sensor setting, a first frame 50 of the video image stream.

The first frame 50 may be a skipped frame in the video image stream. The first frame 50 may be a hidden frame in the video image stream. In other words, the first frame 50 in the video image stream is used in the method 20, but may not be visible in the video image stream.

A sensor setting may be one or more chosen from the group comprising: a sensor exposure time and a sensor gain. The sensor setting may be a combination of a sensor exposure time and a sensor gain. The sensor setting may be a product of the sensor exposure time and the sensor gain.

The method 20 further comprises detecting S204 a local change in intensity values in a portion 590 of the first frame 50. The portion 590 of the first frame 50 represents a first area of the scene. The portion 590 of the first frame 50 may be associated with a foreground object. The foreground object may, for instance, be the car 550 in the scene depicted in FIG. 1B. The portion 590 of the first frame 50 may be dynamically updated. For instance, the portion 590 of the first frame 50 may be moved in frames subsequent to the first frame 50, e.g. following the car 550 moving through the scene.

The method 20 further comprise determining S206 a second sensor setting based on the intensity values in the first frame. The second sensor setting may be an adjustment of sensor exposure time and/or sensor gain in relation to the first sensor setting. The second sensor setting may be an increase or a decrease in the combination of a sensor exposure time and a sensor gain in relation to the first sensor setting.

The method 20 further comprises capturing S208, using the image sensor set to the second sensor setting, a second frame 70 of the video image stream, the second frame 70 being subsequent to the first frame 50. The second frame 70 may be consecutive to the first frame 50. The second frame 70 may be a non-consecutive to the first frame 50.

The method 20 further comprises creating S210 a local tone mapping mask, wherein a local tone mapping in the first area of the scene is different from a local tone mapping in an area outside the first area of the scene, and wherein the local tone mapping in the area outside the first area of the scene is based on a relation between the first sensor setting and the second sensor setting. The relation between the first sensor setting and the second sensor setting may be a ratio between the first sensor setting and the second sensor setting. A local tone mapping in the first area of the scene may be based on the second sensor setting.

The method 20 further comprises applying S212 the local tone mapping mask to the second frame 70 of the video image stream. The local tone mapping mask may be applied to the second frame 70 in a plurality of steps. For instance, an initial local tone mapping mask may be applied to the second frame 70, and subsequent to applying the initial local tone mapping mask, a corrective local tone mapping mask may be applied to the second frame 70. The initial local tone mapping mask may be based on the first sensor setting. The corrective local tone mapping mask may be configured to adjust the local tone mapping in the area outside the first area of the scene. In other words, the local tone mapping mask may be a combination of the initial local tone mapping mask and the corrective local tone mapping mask.

The local tone mapping mask may further comprise a gradient transition between the first area and the area outside the first area.

The method 20 may, for frames subsequent to the second frame 70, further comprise gradually adjusting the local tone mapping mask towards a predetermined local tone mapping mask. In other words, the local tone mapping mask may be adjusted towards the predetermined local tone mapping mask. The adjustment may be made stepwise for each frame subsequent to the second frame 70. The local tone mapping mask may be gradually adjusted towards the predetermined local tone mapping mask for a predetermined number of frames. In other words, after the predetermined number of frames after the second frame 70, the local tone mapping mask may be adjusted to the predetermined local tone mapping mask. The predetermined local tone mapping mask may be based on a sensor setting for a frame subsequent to the second frame 70.

The method 20 may further comprise detecting S216 a second local change in intensity values in a second portion of the first frame 50, wherein the second portion of the first frame 50 represents a second area of the scene. In such case, in the act of creating S210 the local tone mapping mask, a local tone mapping in the second area of the scene is different from a local tone mapping in an area outside the second area of the scene, and wherein the local tone mapping in the area outside the second area of the scene is based on a relation between the first sensor setting and the second sensor setting. A local tone mapping in the second area of the scene may be based on the second sensor setting.

The method 20 may further comprise capturing S218, using the image sensor set to the first sensor setting, an intermediate frame of the video stream. The intermediate frame, in such case, is subsequent to the first frame 50 and antecedent to the second frame 70.

The method 20 may further comprise detecting S220 a further local change in intensity values in a further portion of the intermediate frame. In such case, the further portion of the intermediate frame represents a further area of the scene.

The method 20 may further comprise determining S222 a third sensor setting based on the intensity values in the intermediate frame.

The method 20 may further comprise capturing S224, using the image sensor 302 set to the third sensor setting, a third frame of the video image stream, the third frame being subsequent to the second frame 70.

The method 20 may further comprise creating S226 a further local tone mapping mask, and a local tone mapping in the first area of the scene and the further area of the scene is different from an area outside the first area of the scene and the further area of the scene. In such case, the local tone mapping in the area outside the first area of the scene and the further area of the scene is based on a relation between the first sensor setting and the third sensor setting.

The method 20 may further comprise applying S228 the further local tone mapping mask to the third frame of the video stream.

Figure 3:
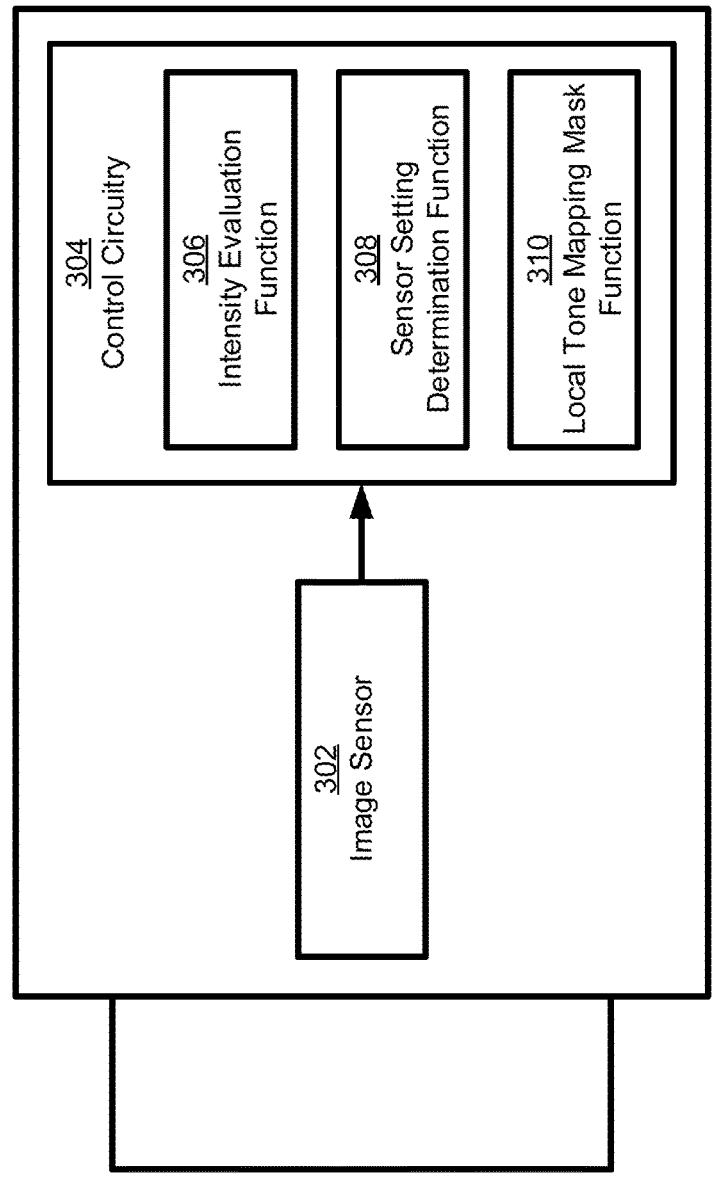
FIG. 3 illustrates a digital video camera configured to capture a video image stream depicting a scene.

FIG. 3 illustrates a digital video camera 30 configured to capture a video image stream depicting a scene. The digital video camera 30 comprises an image sensor 302 configured to be set in different sensor settings. The image sensor 302 is further configured to capture different frames 40, 50, 60, 70 of the video image stream.

The digital video camera 30 further comprises a control circuitry 304. The control circuitry 304 comprises an intensity evaluation function 306, a sensor setting determination function 308, and a local tone mapping mask function 310.

The intensity evaluation function 306 is configured to detect a local change in intensity values in a portion 590 of a first frame 50 captured by the image sensor 302 set to a first sensor setting. The portion 590 of the first frame represents a first area of the scene.

The sensor setting determination function 308 is configured to determine a second sensor setting based on the intensity values in the first frame 50.

The local tone mapping mask function 310 is configured to create a local tone mapping mask, wherein a local tone mapping in the first area of the scene is different from a local tone mapping in an area outside the first area of the scene, and wherein the local tone mapping in the area outside the first area of the scene is based on a relation between the first sensor setting and the second sensor setting.

The local tone mapping mask function 308 is further configured to apply the local tone mapping mask to a second frame 70 captured by the image sensor 302 set to the second sensor setting.

The image sensor 302 and the control circuitry 304 may be synced at a frame level. In other words, the control circuitry 304 may apply the local tone mapping mask to an earliest frame captured by the image sensor 302 set to the second sensor setting. In the examples described here, the earliest frame captured by the image sensor 302 with the second sensor setting is the second frame 60, 70.

The functions 306, 308, 310 of the control circuitry 304 may be implemented as a computer software portion run on a general purpose processor or on a graphics processing unit, a field-programmable gate array, a fixed-function application-specific integrated unit, or an analog circuit.

The person skilled in the art realizes that the present teachings are by no means limited to the preferred variants described above. On the contrary, many modifications and variations are possible within the scope of the appended claims.

For example, the difference between the first and second sensor settings may be a change in sensor gain instead of a change in sensor exposure time as described in relation to FIG. 1A to FIG. 1D. Alternatively, the difference between the first and second sensor settings may also be both a change in sensor exposure time and a change in sensor gain.

Additionally, variations to the disclosed variants can be understood and effected by the skilled person in the art, from a study of the drawings, the disclosure, and the appended claims.

The invention claimed is:

1. A method for reducing intensity variations in a video image stream depicting a scene, the method comprising:
   capturing, using an image sensor set to a first sensor setting, a first frame of the video image stream, wherein the first sensor setting is one or more chosen from the group comprising a sensor exposure time and a sensor gain;
   detecting a local change in intensity values in a portion of the first frame as compared with a frame preceding the first frame, the frame preceding the first frame being captured using the image sensor set to the first sensor setting, wherein the portion of the first frame represents a first area of the scene;
   determining a second sensor setting based on the intensity values in the first frame, wherein the second sensor setting is said one or more chosen from the group comprising the sensor exposure time and the sensor gain;
   capturing, using the image sensor set to the second sensor setting, a second frame of the video image stream, the second frame being subsequent to the first frame;
   creating a local tone mapping mask being an image mask comprising information related to a tone mapping of an image, wherein a local tone mapping of the local tone mapping mask in the first area of the scene is different from a local tone mapping of the local tone mapping mask in an area outside the first area of the scene, wherein the local tone mapping in the first area of the scene is based on the second sensor setting, and wherein the local tone mapping in the area outside the first area of the scene is based on a relation between the first sensor setting and the second sensor setting; and
   applying the local tone mapping mask to the second frame of the video image stream;
   for frames subsequent to the second frame, gradually adjusting the local tone mapping mask towards a predetermined local tone mapping mask.

2. The method according to claim 1, wherein the second sensor setting is an adjustment of the sensor exposure time and/or sensor gain in relation to the first sensor setting.

3. The method according to claim 1, wherein the relation between the first sensor setting and the second sensor setting is a ratio between the first sensor setting and the second sensor setting.

4. The method according to claim 1, wherein the local tone mapping mask further comprises a gradient transition between the first area and the area outside the first area.

5. The method according to claim 1, further comprising:
   capturing, using the image sensor set to the first sensor setting, an intermediate frame of the video stream, the intermediate frame being subsequent to the first frame and antecedent to the second frame;
   detecting a further local change in intensity values in a further portion of the intermediate frame as compared with a frame preceding the intermediate frame, the frame preceding the intermediate frame being captured using the image sensor set to the first sensor setting, wherein the further portion of the intermediate frame represents a further area of the scene;
   determining a third sensor setting based on the intensity values in the intermediate frame, wherein the third sensor setting is one or more chosen from the group comprising the sensor exposure time and the sensor gain;
   capturing, using the image sensor set to the third sensor setting, a third frame of the video image stream, the third frame being subsequent to the second frame;
   creating a further local tone mapping mask being an image mask comprising information related to a tone mapping of an image, wherein a local tone mapping in the first area of the scene and the further area of the scene is different from an area outside the first area of the scene and the further area of the scene, wherein the local tone mapping in the first area of the scene and the further area of the scene is based on the third sensor setting, and wherein the local tone mapping in the area outside the first area of the scene and the further area of the scene is based on a relation between the first sensor setting and the third sensor setting; and
   applying the further local tone mapping mask to the third frame of the video stream.

6. A digital video camera configured to capture a video image stream depicting a scene, the digital video camera comprising:
   an image sensor configured to be set in different sensor settings, and to capture different frames of the video image stream, wherein the sensor setting is one or more chosen from the group comprising a sensor exposure time and a sensor gain;

a control circuitry comprising:

an intensity evaluation function configured to detect a local change in intensity values in a portion of a first frame as compared with a frame preceding the first frame, the first frame and the frame preceding the first frame being captured by the image sensor set to a first sensor setting, wherein the portion of the first frame represents a first area of the scene;

a sensor setting determination function configured to determine a second sensor setting based on the intensity values in the first frame; and a local tone mapping mask function configured to create a local tone mapping mask being an image mask comprising information related to a tone mapping of an image, wherein a local tone mapping of the local tone mapping mask in the first area of the scene is different from a local tone mapping of the local tone mapping mask in an area outside the first area of the scene, wherein the local tone mapping in the first area of the scene is based on the second sensor setting, and wherein the local tone mapping in the area outside the first area of the scene is based on a relation between the first sensor setting and the second sensor setting, and to apply the local tone mapping mask to a second frame captured by the image sensor set to the second sensor setting, wherein, for frames subsequent to the second frame, the local tone mapping mask is gradually adjusted towards a predetermined local tone mapping mask.

7. The digital video camera according to claim 6, wherein the image sensor and the control circuitry are synced at a frame level.

8. The digital video camera according to claim 6, wherein a function of the control circuitry is implemented as a computer software portion run on a general purpose processor or on a graphics processing unit, a field-programmable gate array, a fixed-function application-specific integrated circuit, or an analog circuit.

9. A non-transitory computer readable recording medium having recorded thereon program code which when executed at a device having processing capabilities is configured to perform a method comprising:

capturing, using an image sensor set to a first sensor setting, a first frame of the video image stream, wherein the first sensor setting is one or more chosen from the group comprising a sensor exposure time and a sensor gain;

detecting a local change in intensity values in a portion of the first frame as compared with a frame preceding the first frame, the frame preceding the first frame being captured using the image sensor set to the first sensor setting, wherein the portion of the first frame represents a first area of the scene;

determining a second sensor setting based on the intensity values in the first frame, wherein the second sensor setting is one or more chosen from the group comprising the sensor exposure time and the sensor gain;

capturing, using the image sensor set to the second sensor setting, a second frame of the video image stream, the second frame being subsequent to the first frame;

creating a local tone mapping mask being an image mask comprising information related to a tone mapping of an image, wherein a local tone mapping in the first area of the scene is different from a local tone mapping in an area outside the first area of the scene, wherein the local tone mapping in the first area of the scene is based on the second sensor setting, and wherein the local tone mapping in the area outside the first area of the scene is based on a relation between the first sensor setting and the second sensor setting; and applying the local tone mapping mask to the second frame of the video image stream, wherein, for frames subsequent to the second frame, the local tone mapping mask is gradually adjusted towards a predetermined local tone mapping mask.

* * * * *